3,236,634
PROCESS FOR PRODUCTION OF HIGH SURFACE AREA TUNGSTEN AND TUNGSTEN TRIOXIDE POWDERS
Foraker Lambdin, Jr., Alcoa, and Lawrence R. Phillips, Oak Ridge, Tenn., assignors, by mesne assignments, to the United States of America as represented by the United States Atomic Energy Commission
No Drawing. Filed Feb. 12, 1962, Ser. No. 172,814
14 Claims. (Cl. 75—.5)

The present invention relates to particulate tungsten metal having high surface area and an integrated and continuous process for the production thereof.

Tungsten metal powders have been produced by hydrogen reduction for a good number of years. Heretofore, it has not been possible to produce tungsten powder having a surface area of greater than about 1.45 square meters per gram and a calculated mean particle size of less than about 0.21 microns by hydrogen reduction or other techniques.

In producing tungsten powder by the hydrogen reduction technique it is generally known that the critical factor which controls the final particle size and surface area of tungsten powder is the particle size and surface area of tungsten trioxide utilized as a starting material in the hydrogen reduction step.

High surface area and minute particle size are desired in tungsten powders where they are to be used to produce finished pieces of near theoretical density by cold-pressing at realtively low compacting pressures (20,000 to 30,000 p.s.i.) and sintering at relatively low temperatures (1500° centigrade). In addition, the pieces produced from these powders require less sintering time to attain a given density than pieces produced from lower surface area powders.

Accordingly, it is an object of the present invention to provide tungsten trioxide having a mean particle size ranging from about 0.08 to about 0.013 microns and having a surface area ranging from about 10 to about 60 square meters per gram.

It is a further object to provide tungsten powders which enables an artisan to fabricate powder compacts having densities closely approaching the theoretical density of tungsten metal.

It is another object of the present process to provide tungsten powder having a mean particle size ranging from about 0.10 micron to about 0.05 micron and having a surface area ranging from about 3.0 square meters per gram to about 6.0 square meters per gram.

It is a further object to provide a process for producing the tungsten trioxide and tungsten powder as described above.

It is a still further object to provide a method of producing low carbon tungsten trioxide and tungsten powder having the properties described above.

It is another object to provide an integrated and improved process for producing non-pyrophoric tungsten powder having the properties described above.

The tungsten powder of the present invention consists of an agglomeration of tungsten crystallites. The tungsten crystallites have a size ranging from about 400 to about 500 Angstrom units, as indicated by X-ray line-broadening in the gross powder particles, are agglomerated to form a powder having a mean particle size ranging from about 0.10 to about 0.05 microns and a surface area ranging from about 3.0 square meters per gram to about 6.0 square meters per gram.

The tungsten trioxide powder particles of the present invention also consist of an agglomeration of tungsten trioxide crystallites. The crystallites range in size from about 100 to about 300 angstroms. These crystallites are agglomerated to form the tungsten trioxide particles which in gross (i.e., as a powder) exhibit a mean particle size ranging from about 0.08 to about 0.013 microns in size and a surface area about 10 to 60 square meters per gram.

As previously noted, the particle size and surface area of the final tungsten powder are largely governed by the particle size and surface area of the precursor, tungsten trioxide; that is, hydrogen reduction under optimum conditions of a high surface area tungsten trioxide powder of minute mean particles size will generally result in production of fine particles of tungsten metal also having a high surface area.

Several rather standard and well known process steps are generally practiced in production of tungsten metal powder via hydrogen reduction of tungsten trioxide. They comprise: (1) solid-solid nitric acid conversion of commercial ammonium paratungstate to tungstic acid, (2) solubilization of the resultant tungstic acid in an ammonium hydroxide solution, (3) reprecipitation of tungstic acid with nitric acid, (4) drying the tungstic acid at elevated temperatures to form tungsten trioxide, and (5) hydrogen reduction of tungsten trioxide to form tungsten metal powder.

The first step (1) is generally accomplished by treating commercial ammonium paratungstate with an approximately 8 molar solution of nitric acid whereby a solid-solid conversion of ammonium paratungstate to tungstic acid is effected. This conversion step is desirable because it is a practical method of converting the ammonium salt into a compound readily soluble in an ammonia solution. It is desirable to convert the material into an ammonia solution so that purification can be accomplished and fine particles can be precipitated therefrom.

Step two (2), involving dissolution of tungstic acid in ammonium hydroxide, converts the tungstic acid to the ammonium tungstate solution which is one reactant in the preparation of the tungstic acid later used in the production of the final tungsten powder.

Step three (3) is probably the most critical step in the integrated process for the production of tungsten powder since it is this step which produces the tungstic acid which is dehydrated to form the tungsten trioxide used in the hydrogen reduction step. This step is discussed in detail hereinafter.

Step four (4) is merely a dehydration step to remove the water of crystallization from $H_2WO_4$ to form $WO_3$ and is normally conducted for various periods of time at temperatures up to about 200 degrees centigrade.

Step five (5) comprises hydrogen reduction of $WO_3$ to form tungsten metal and is normally conducted by impinging dry hydrogen for periods of about five hours on $WO_3$ at temperatures ranging from about 700 to about 800° C. (preferably about 740° C.).

In general, it can be acknowledged that the reaction (i.e., the ammonium tungstate solution with nitric acid solution) of step three (3) is well known and has been utilized in various applications to cause formation of tungstic acid. By the same token, the production of high surface area tungsten trioxide by first producing a high surface area tungstic acid of minute particle size via the reaction of step three (3) is not well known. It has been found that several critical process parameters must be considered to obtain optimum size and surface area tungstic acid. The process parameters include reactant concentrations, reactant flow rates, the diameter of the reactant stream and temperature of the reactants. The above-mentioned process parameters must be coordinately controlled and maintained within fixed limits to produce the desired minute size and high surface area tungstic acid and later tungstic trioxide and tungsten powder of the present invention.

Two reactants are utilized in preparing the minute sized tungstic acid powders; namely, ammonium tungstate and nitric acid. The concentration of the ammonium tungstate must be maintained between about 0.5 and 1.5 pounds W/gallon while the nitric acid must be maintained between about 6.0 to 16.0 molar.

Generally, more concentrated solutions of nitric acid give larger particles and powder having a lower surface area.

The preferred reactant concentrations are 8 molar nitric acid and an ammonium tungstate solution containing 1.0 pound of tungsten per gallon at a pH of approximately 10.

The temperature of the reactants immediately prior to contact preferably are maintained at room temperature. The reaction between ammonium tungstate and nitric acid is exothermic, and consequently, the reactant mixture will increase in temperature during reaction. Cooling is necessary at the point of contact and reaction between the nitric acid and ammonium tungstate. Any standard heat exchanger can be utilized to remove heat from the reactant system. The temperature of the reaction mixture must be maintained below about 90° C. In addition the reaction product, e.g. tungstic acid, must be cooled and removed from the mother liquor as soon as possible, preferably in less than 8 hours after formation to prevent particle growth.

Reactant flow rate is a critical consideration in the production of the present novel products and is closely related to and considered herein in conjunction with the diameter of the reactant streams. In general, the permissible reactant flow rate ranges (1) from about 0.5 foot per second to about 15 feet per second when the reactant streams are about 2 mm. in diameter, (2) from about 2 to about 6.0 feet per second when the reactant streams are about 4 mm. in diameter, and (3) less than about 6 feet per second when the reactant streams are about 6 mm. in diameter. From the actual results of approximately 115 runs on pilot plant scale whereby approximately 3000 pounds of tungsten trioxide were produced, it has been found that the average surface area of the tungsten trioxide powder was approximately 31.0 square meters/gram when the reactant stream velocity was maintained at about 3.1 feet per second and the diameters of the reactant streams were about 6 mm.

The following Table I shows data resulting from various processes conducted at a fixed reactant concentration of 8 molar nitric acid and an ammonium tungstate solution containing 1.0 pound/gallon of tungsten at a pH of about 10. The temperature of the reactants was kept at room temperature and the heat of the reactant solution was removed afer the precipitation step by a standard heat exchanger to maintain a temperature of approximately 25° C.

TABLE I

| Reactant Stream Diameter, mm. | Reactant Velocity (ft./sec.) | Surface Area of Tungsten Trioxide (in m.²/g.) |
| --- | --- | --- |
| 6 | 0.6 | 61.7 |
| 6 | 1.9 | 47.5 |
| 6 | 2.5 | 35.2 |
| 6 | 2.7 | 17.5 |
| 4 | 4.4 | 24.1 |
| 4 | 5.2 | 27.5 |
| 4 | 4.3 | 35.5 |
| 2 | 8.8 | 61.0 |
| 2 | 10.9 | 39.2 |
| 2 | 13.2 | 30.0 |

Powder metallurgy techniques require the use of very high purity tungsten powder, especially from the standpoint of carbon impurities. Tramp carbon is undesirable in tungsten powders for several reasons including the following: (1) carbon combines with the oxygen present in the powder to form carbon monoxide (CO) which causes blistering on evolution from the pressed piece during sintering, (2) carbon causes voids in a sintered piece due to evolution as a gas, (3) voids caused by carbon lower the overall density and strength and cause nonhomogeneity and (4) carbon in the presence of tungsten can form tungsten carbide (WC) in the sintering process which has a lower melting point than pure tungsten.

Carbon contaminants are present in the present system by virtue of the impurity being in the starting material or are obtained by the system due to process contamination.

It has been found that the carbon content of the tungsten powder is generally maintained approximately the same as the carbon content of the tungsten trioxide prior to hydrogen reduction. In general, in the present process utilizing standard reactants, the tungsten trioxide and tungsten metal powder had very low carbon contamination. The average carbon contamination was about 100 p.p.m. carbon.

As an integral part of the preferred process disclosed herein, it has been found that carbon contamination of the tungstic oxide and tungsten metal produced in the present process can be reduced by about 60 to 70 percent if the tungsten trioxide powder is heated to a temperature ranging from about 500 to about 575 degrees centigrade in an environment of dry air. This step is preferred in the integrated process not only because it substantially reduces carbon contamination but in addition (1) provides a process variable whereby the surface area of various powders can be lowered to produce an oxide and metal powder product having controlled particle size and surface area measurements. (This allows more choice in the product being made) and (2) causes a significant reduction in the variance of the surface area of the tungsten trioxide and tungsten metal powders thereby enabling an artisan to produce more uniform products.

Tables II, III, and IV show the impurity levels of various reactants and products as they pass through the present process and how the additional treatment at elevated temperatures in air greatly reduces carbon content in both the tungsten trioxide and the tungsten metal powder.

TABLE II

*Impurity levels in tungsten trioxide process streams*

| Stream | No. Samples | Average Total Contamination Per Sample (p.p.m.) Metal Basis | Principle Contaminants (p.p.m.—metal basis) | | | | | |
| --- | --- | --- | --- | --- | --- | --- | --- | --- |
| | | | C | Al | Si | Fe | Ca | Other |
| Virgin Ammonium paratungstate (APT) | 16 | 85 | 67 | 7 | 3 | 3 | 1 | 4 |
| WO₃ from Virgin APT | 24 | 78 | 60 | 13 | 5 | 0 | 0 | 0 |
| WO₃ after Carbon Removal | 43 | 64 | 36 | 10 | 6 | 6 | 1 | 5 |

Table III shows the results of heating tungsten trioxide in air at various temperatures and the extent of carbon removal obtained by such a treatment.

TABLE III

*Removal of carbon from tungsten trioxide*

| Run | Kiln Temperature (°C.) | Average Product Rate (lbs./hr.) | Estimated Time in Hot Zone (hrs.) | Average Carbon Content (p.p.m. metal basis) | | Air Flow (c.f.m.) |
| --- | --- | --- | --- | --- | --- | --- |
| | | | | Feed | Product | |
| 27 | 515 | 0.95 | 5.5 | 72 | 33 | 0.35 |
| 29 | 520 | 1.50 | 3.0 | Approx. 100 | 63 | 0.43 |
| 33 | 550 | 0.61 | 4.0 | Approx. 100 | 62 | 0.43 |
| 40 | 550 | 0.69 | 4.0 | Approx. 100 | 44 | 0.70 |
| 43 | 550 | 1.12 | 3.5 | Approx. 100 | 82 | 0.70 |
| 46 | 575 | 1.07 | 5.0 | Approx. 100 | 36 | 0.80 |
| 50 | 550 | 0.83 | 4.5 | Approx. 36 | 27 | 0.70 |

Table IV shows analyses of three tungsten powder products produced from tungsten trioxide which had been previously treated in air at elevated temperatures.

TABLE IV

*Average impurities in tungsten metal powder*

| Run Batch | Average Total Impurity (p.p.m.) | Carbon | Copper | Average Level (p.p.m.) | | Chromium | Other |
|---|---|---|---|---|---|---|---|
| | | | | Iron | Silicon | | |
| 47 | 108 | 73 | 3 | 18 | 3 | 5 | 6 |
| 48 | 62 | 50 | 4 | 0 | 0 | 3 | 5 |
| 49 | 165 | 52 | 23 | 44 | 4 | 10 | 32 |

From the data presented in Tables II, III and IV it is readily apparent that treatment of the tungsten trioxide powder prior to hydrogen reduction enables an artisan to produce tungsten metal powder having very low carbon contents in addition to high surface area and minute particle size.

In some instances it may be desirable to conduct the drying step whereby tungstic acid is converted to tungsten trioxide simultaneously with the treatment at elevated temperatures to remove carbon contamination. In this combination of steps, the conversion of tungstic acid to tungsten trioxide is readily accomplished as the tungstic acid is approaching the elevated temperature required for the carbon removal step.

In addition, prior to reducing the tungstic trioxide to tungsten metal another step may be incorporated; namely, pulverization of the tungsten trioxide in any standard equipment. It should be noted that this pulverization step does not contribute to producing a smaller sized tungsten metal powder. As previously mentioned, the particle size of the final metal powder is governed by the tungstic acid precipitation steps. The pulverization step is conducted to render the oxide more permeable to the hydrogen gas during reduction and to aid in preventing incomplete reduction. The increased permeability of the oxide powder apparently aids in preserving high surface area in the powder and aids in reduction since the water vapor given off during the reduction step can be swept away from the metal product faster; such water should not remain at the reduction site since it alters the oxidation-reduction potential and promotes crystal growth, thereby increasing particle size and decreasing surface area.

It should be noted that the tungsten metal powders resulting from the hydrogen reduction step are at a very high temperature and of extremely fine size. Handling of these hot powders must be accomplished in inert atmospheres not only during cooling to prevent oxidation, but to prevent the highly pyrophoric powders from undergoing spontaneous combustion even at room temperature in the presence of air.

It has been found that the powders can be rendered essentially non-pyrophoric at room temperature in air thereby greatly simplifying the handling problems if the powders are treated under a vacuum of less than about 10 microns of Hg for a period of about one to two hours as disclosed and claimed as a separate invention in U.S. application No. 172,810, filed February 12, 1962, by L. R. Phillips, now U.S. Patent No. 3,170,785, issued February 23, 1965. This additional treatment may be conveniently utilized as an additional step in the present process if so desired and indeed is employed herein in the preferred method of conducting the present process. It is further noted that the aforementioned vacuum treatment may be conducted at room temperature or a elevated temperature or also during cool-down of the powders subsequent to hydrogen reduction of tungsten oxide at an elevated temperature.

What we claim is:

1. A process for the manufacture of tungsten trioxide powder having a mean particle size ranging from about 0.08 to 0.013 micron and a surface area ranging from about 10 to 60 m.$^2$/gm., comprising the steps of:
   (1) intersecting (a) at least one reactant stream of an aqueous solution of ammonium tungstate having a concentration of about 0.5 to 1.5 pounds of tungsten per gallon of solution with (b) at least one reactant stream of about 6 to 16 molar nitric acid, at a temperature below 90° C. to produce tungstic acid, wherein the diameters of each of said reactant streams ranges from about 2 to 6 mm. and wherein the velocity of each of said reactant streams ranges from about 0.5 to 15 ft./sec. and then,
   (2) heating and drying said tungstic acid at a temperature up to about 200° C. to remove water and convert said tungstic acid to tungsten trioxide.

2. The process of claim 1 wherein the aqueous solution of ammonium tungstate has a concentration of about 1 pound of tungsten per gallon of solution, and wherein the nitric acid is about 8 molar.

3. The process of claim 1 wherein the diameters of each of said reactant streams is about 2 mm.

4. The process of claim 1 wherein the diameters of each of said reactant streams is about 4 mm., and the velocities of each of said reactant streams range from about 2 to 6 ft./sec.

5. The process of claim 1 wherein the diameters of each of said reactant streams is about 6 mm. and the velocities of each of said reactant stream is less than about 6 ft./sec.

6. The process of claim 1 wherein the intersecting reactant streams are maintained at a temperature of about 25° C.

7. The process of claim 1 wherein the tungsten trioxide produced in step (2) is heated at a temperature of from about 500–575° C. in dry air for a time sufficient to reduce the carbon content of the tungsten trioxide to a level not greater than about 100 p.p.m.

8. A process for the manufacture of tungsten powder having a mean particle size ranging from about 0.05 to 0.10 micron and a surface area ranging from about 3.0 to 6.0 m.$^2$/gm., comprising the steps of:
   (1) solid-solid nitric acid conversion of ammonium paratungstate to tungstic acid,
   (2) dissolving said tungstic acid with concentrated ammonium hydroxide to form an aqueous solution of ammonium tungstate having a concentration of from about 0.5 to 1.5 pounds of tungsten per gallon of solution,
   (3) intersecting (a) at least one reactant stream of the aqueous solution of ammonium tungstate produced in step (2) with (b) at least one reactant stream of about 6 to 16 molar nitric acid, at a temperature below 90° C. to produce tungstic acid, wherein the diameters of said reactant streams range from about 2 to 6 mm. and wherein the velocity of each of said reactant streams ranges from about 0.5 to 15 ft./sec.,
   (4) heating and drying said tungstic acid at a temperature up to about 200° C. to remove water and convert said tungstic acid to tungsten trioxide, and
   (5) reducing said tungsten trioxide to tungsten powder in a stream of hot hydrogen gas.

9. The process of claim 8 wherein the ammonium tungstate solution of step (2) has a concentration of about 1 pound of tungsten per gallon of solution, and wherein the nitric acid of step (3) is about 8 molar.

10. The process of claim 8 wherein the diameters of each of said reactant stream is about 2 mm.

11. The process of claim 8 wherein the diameters of each of said reactant streams is about 4 mm., and the velocities of each of said reactant streams range from about 2 to 6 ft./sec.

12. The process of claim 8 wherein the diameters of each of said reactant streams is about 6 mm. and the velocities of each of said reactant streams is less than about 6 ft./sec.

13. The process of claim 8 wherein the intersecting reactant streams are maintained at a temperature of about 25° C.

14. The process of claim 8 wherein the tungsten trioxide produced in step (2) is heated at a temperature of from about 500–575° C. in dry air for a time sufficient to reduce the carbon content of the tungsten trioxide to a level not greater than about 100 p.p.m.

References Cited by the Examiner

UNITED STATES PATENTS

| | | | |
|---|---|---|---|
| 1,008,807 | 11/1911 | Farkas | 148—13.1 X |
| 2,398,114 | 4/1946 | Rennie | 75—84 |
| 2,427,339 | 9/1947 | Alexander | 23—204 |
| 2,545,821 | 3/1951 | Lindsley et al. | 75—84 |
| 2,690,380 | 9/1954 | Taylor | 23—204 |
| 2,763,541 | 9/1956 | Mettler | 75—.5 |
| 2,806,774 | 9/1957 | Millner et al. | 75—.5 |

OTHER REFERENCES

Kopelman, article in A.I.M.E. Transactions, vol. 171, page 457 (1947).

Kopelman, article in *The Physics of Powder Metallurgy*, edited by W. E. Kingston, 1st ed. (1951), page 303.

Smithells, "Tungsten," Chapman & Hall Ltd., London, 2nd Ed., 1945, pages 24–31.

Smithells, "Tungsten," Chapman & Hall Ltd., London, 2nd Ed., 1945, pages 9–23.

MAURICE A. BRINDISI, *Primary Examiner.*

DAVID L. RECK, *Examiner.*